May 16, 1967  W. R. THOMPSON  3,319,366
EARTH HANDLING MACHINE
Filed Aug. 26, 1963  3 Sheets-Sheet 1

INVENTOR.
WILLIAM R. THOMPSON
BY
Townsend and Townsend
ATTORNEYS

INVENTOR.
WILLIAM R. THOMPSON
BY
Townsend and Townsend
ATTORNEYS

May 16, 1967  W. R. THOMPSON  3,319,366
EARTH HANDLING MACHINE
Filed Aug. 26, 1963  3 Sheets-Sheet 3
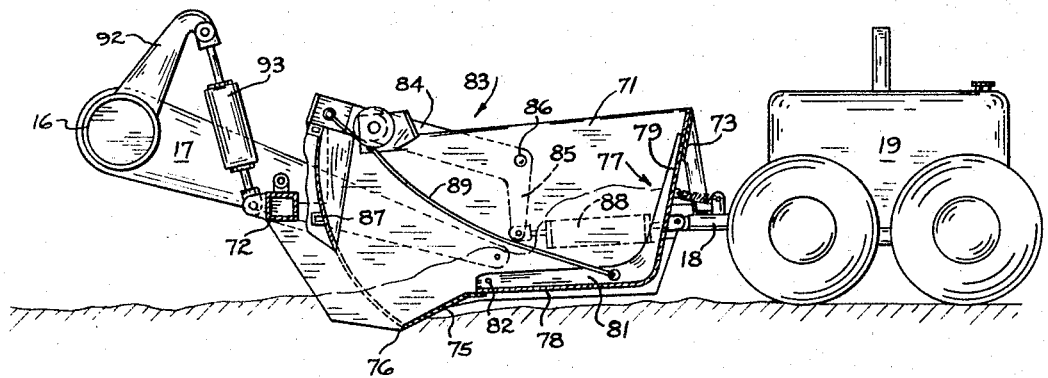
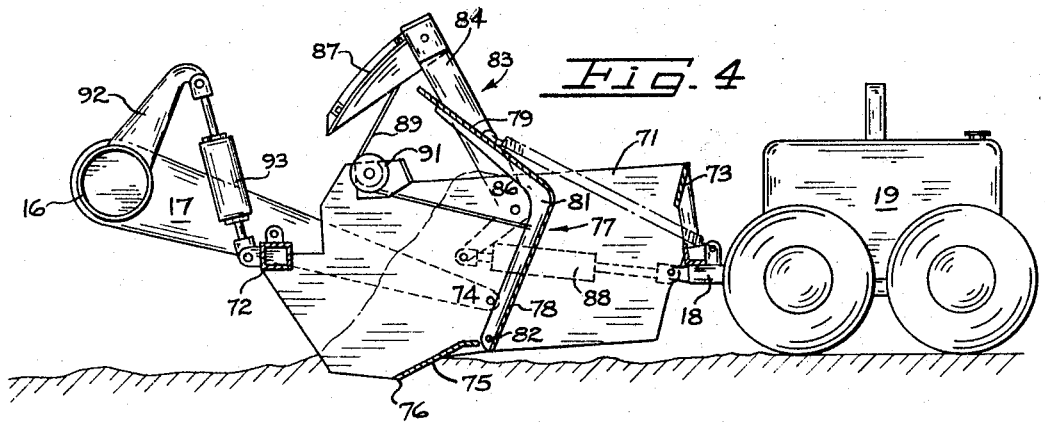
INVENTOR.
WILLIAM R. THOMPSON
BY
*Townsend and Townsend*
ATTORNEYS

3,319,366
EARTH HANDLING MACHINE
William R. Thompson, San Jose, Calif., assignor to Atlas Motor Graders, Inc., Las Vegas, Nev., a corporation of Nevada
Filed Aug. 26, 1963, Ser. No. 304,453
5 Claims. (Cl. 37—117.5)

The present invention relates in general to an earth handling machine and more particularly to a self-propelled structure having at least a scarifier assembly, a grader assembly and a scoop bucket assembly mounted on a self-propelled transportable frame.

In the past, individual graders, oftentimes provided with a scarifier assembly, have been provided and have either been drawin by accessory equipment or self-propelled. Also, earth handling machines having a scoop or dump bucket have been in wide use. In major construction operations such as in leveling and grading operations for highway construction or preparation of a building site these earth handling machines are used individually intermittently. A considerable saving can be made if one earth handling machine can perform the functions of these several machines.

Applicant is aware of one machine in which an attempt was made to combine the operations of these several different machines. However, this machine suffers from a number of shortcomings which make it wholly impractical. First of all, the machine is not a self-propelled unit but is drawn by a pulling tractor. Under this arrangement, in order to provide the machine with a tractor having sufficient power and traction to pull the machine under the conditions of heaviest load, the tractor employed is far overpowered for the usual operating conditions. Also, the scarifier assembly in this combination unit is positioned behind the grader assembly and therefore the scarifier and grader cannot be used in one operation to break up and grade the earth since the ground cannot be broken up until after the grader assembly has passed. Another shortcoming of the prior combination machine is the inability of the driver to see the ground ahead of the machine as well as to be able to see the different assemblies in operation. For example, in the machine drawn by a tractor, the operator sits upon the tractor seat and has to turn around to watch the operation of the grader in order to properly control the grader, and with the scarifier assembly behind the grader he cannot see much of the scarifying operation. However, of greatest importance is his inability to see inside the bucket in the scoop bucket assembly to determine the amount of earth that has been picked up. In one configuration of the prior combination machine, provision is made for an operator to sit on the drawn machine which has the scoop bucket positioned at the front of the machine behind which the grader is mounted. With this structure two operators are required, one on the earth handling machine and one on the pulling tractor, and it is diffiicult for the two operators to coordinate their thoughts as to how the machine should be utilized. Of greater importance is the inability of the operator sitting on the machine to see the ground in front of the scoop bucket since the bucket completely obstructs his view. Additionally, this prior art combination machine, like all conventional graders, utilizes a draw bar on the grader assembly to pull the grader assembly across the ground beng worked. This arrangement suffers from the difficulty that when grading hard surfaces or deep cuts of earth, considerable weight is required to hold the grader on the ground.

Still a further shortcoming of the prior art combination machine lies in the fact that with the tractor pulling the machine from the front end, the manoeuverability of the machine is considerably hampered. For example, in utilizing the machine to handle earth close to a confining object in which case the pulling tractor has to drive up to the object and then back the machine up, the distance from the front of the tractor to the particular assembly on the machine utilized in the earth handling operation is a considerably extended distance thereby limiting the usefulness of the machine under confined circumstances.

The earth moving machine according to the present invention is a self-propelled machine having a transportable frame with a scarifier assembly mounted at the front of the machine, a grader assembly mounted behind the scarifier assembly and a scoop bucket assembly mounted behind the grader assembly. At the front of the machine the frame includes a pair of spaced apart arcuate members from which the grader assembly and scarifier assembly are hung by means of fiuid-operated jacks. The arcuate members end on a draft tube which extends across the machine and behind which is mounted the scoop bucket assembly. The operator's platform or chair is positioned between the arcuate members and between the grader assembly and the bucket assembly. The grader assembly is supported on a push bar the forward end of which is suspended from the arcuate members by lift jacks and the rear end of which is provided with a ball receivable in an elognate tubular socket. The tubular socket which has an arcuate shape is supported on the draft tube and extends across the machine.

With the machine according to the present invention, the problems encountered with the use of an auxiliary towing tractor are avoided. For example, the machine can move into close quarters and the earth handling assemblies are sufficiently close to the front of the machine to come close to obstacles. Additionally, the power plant serves as weight to provide traction for driving the machine as well as weight to hold the machine down for earth handling operations. Additionally, the power plant serves to provide the power on the machine for operating the individual earth handling assemblies hydraulically or in any other manner desirable.

Probably the greatest advantage of the self-propelled machine is the cooperation between the bucket and the drive wheels for producing the desired amount of traction. The usable horse-power in a machine of this type is determined by the amount of traction produced by the machine and this traction is largely dependent upon the weight of the structure. With a conventional grader or the prior art combination structure, only a certain amount of horse-power can be utilized because of the weight of the machine. In order to provide additional horse-power than can be utilized, additional weight must be added to the machine producing the traction. In the present machine, it is possible to control the traction by loading or unloading dirt in the scoop bucket to be carried while performing the different functions of the separate assemblies of the machine. Therefore, the power plant can be of greater horse-power than conventional power plants on structures of similar size and when the extra horse-power is needed, a certain amount of earth can be picked up by the bucket to provide the necessary traction in order to utilize the additional horse-power.

As an additional feature of this invention, by positioning the scarifier assembly in front of the grader assembly, which in turn lies in front of the scoop bucket assembly, all three assemblies can be used to best advantage at one time. For example, earth can be scarified and graded and then the excess picked up by the bucket or the scarifier can be used by itself or in combination with either the grader assembly or the bucket assembly.

Another advantage of the invention lies in the fact that the pair of arcuate frame members between which the driver sits provides greater strength and stability to the machine than the conventional single solid frame member and also provides a better arrangement for mounting the scarifier and grader assemblies therefrom. For example, as described in greater detail below, each of these assemblies can be supported by two spaced apart hydraulic cylinders or fluid jacks, one cylinder depending from each of the arcuate members.

The construction according to the present invention also provides greater ease in operation by the opeartor who sits on the machine itself and who has greater visibility of both the assemblies and the ground in front of the grader. For example, the operator sitting between the two arcuate members can see between these members directly to the ground in front of the machine and can look down below him between the arcuate members and watch the operation of both the scarifier and grader assemblies. Additionally, he can look down inside the scoop bucket directly behind him to see how much earth is being or has been picked up by the scoop bucket assembly.

A still further advantage of this invention lies in the operation of the grader assembly which is pushed by a push bar rather than pulled by the conventional draw bar. When a grader assembly is pushed from a pivot point behind the grader blade, the forces applied to the blade when the machine is in motion and the blade engages the ground create a torque about the pivot point tending to force the grader further into the ground. On the other hand, in a conventional grader using a draw bar pivoted from a point in front of the blade the ground forces against the grader blade produce a torque about the pivot point which tends to raise the grader assembly out of the graund. Thus, with the pushed grader according to the present invention, it is necessary to hold the grader assembly up while in the conventional draw bar type grader assembly it is necessary to apply down pressure to the grader assembly. This factor becomes extremely important since when down pressure is applied for the grading operation, the amount of force pushing the wheels to the ground is reduced, the forces pushing down on the wheels being a function of the weight of the machine. In both pulled and self-propelled machines reduced weight on the wheels creates steering problems and often requires front leaning wheels. Furthermore, in a self-propelled machine, reduced weight on the wheels reduces the amount of traction of the machine and therefore results in a reduction in the maxium load which can be handled. In draw bar grader assemblies where down pressure is required the pressure must be achieved by a complicated and cumbersome mechanism on the frame and in any event, the size of the load which the grader can handle is limited by the weight of the machine. Thus, it is necessary to add as much weight as possible to the draw bar type of machine to provide the necessary down pressure and traction for the load since down pressure on any tool making contact with the earth will rob valuable pounds from the traction wheels.

In the self-propelled push bar grader machine according to the present invention, the weight of the machine can be considerably less than that of a drawn grader assembly machine which will handle the same maxium load because the torque on the blade pulls the blade into the ground rather than pushes the blade out of the ground thereby providing greater rather than less traction for the drive wheels. This arrangement relieves the requirement for leaning wheels. Also, and more important, the horsepower necessary to drive the machine according to the present invention is reduced since it is not necessary to drive the dead weight which is added to draw bar type grader assembly machines to provide the necessary down pressure. The combination on a self-propelled frame of a push bar grader assembly that does not require down pressure and a scoop bucket assembly that can be loaded to add weight for the grader operation provides an assembly with a desirable usable horse-power figure.

The arcuate socket member for the push bar of the grader assembly permits the assembly to be moved laterally for grading inclined banks and the like. The push bar grader assembly on the machine according to the present invention provides the same advantages in grading inclined banks as those pointed out above. More specifically, no down pressure is required on the grader assembly, and the grader is not pushed away from the bank by the grading operation as in prior graders having a conventional draw bar. Additionally, in the machine having a push bar type grader assembly, the conventional draw bar is removed so that the scarifier assembly positioned in front of the grader assembly can be raised on the machine frame above the grader assembly thereby providing the operator a clear view of the ground in front of the grader.

As an additional feature of the present invention, the grader machine is provided with means for moving the position of the back wheels with respect to the front portion of the machine frame in order to enable the machine to make sharper turns. One specific structure for accomplishing this end is the provision of a vertical axis massive hinge in the frame between the bucket assembly and the rear wheels. This hinge is designed to permit the frame to swivel about 15° when the front wheels are turned and thereby permits the machine to turn in a circle of shorter radius than otherwise would be permitted.

The machine is adapted for mounting additional assemblies such as a bulldozer blade at the front of the machine whereby other operations may be performed in addition to those described above.

Other objects of the present invention will become apparent upon reading the following specification and referring to the accompanying drawings in which similar characters of reference represent corresponding parts in each of the several views.

In the drawings:

FIGS. 3 and 4 are side elevational views, partially in section, of the scoop bucket assembly portion of the machine shown in FIG. 1 with the bucket in loading and dumping positions respectively;

Figure 1:
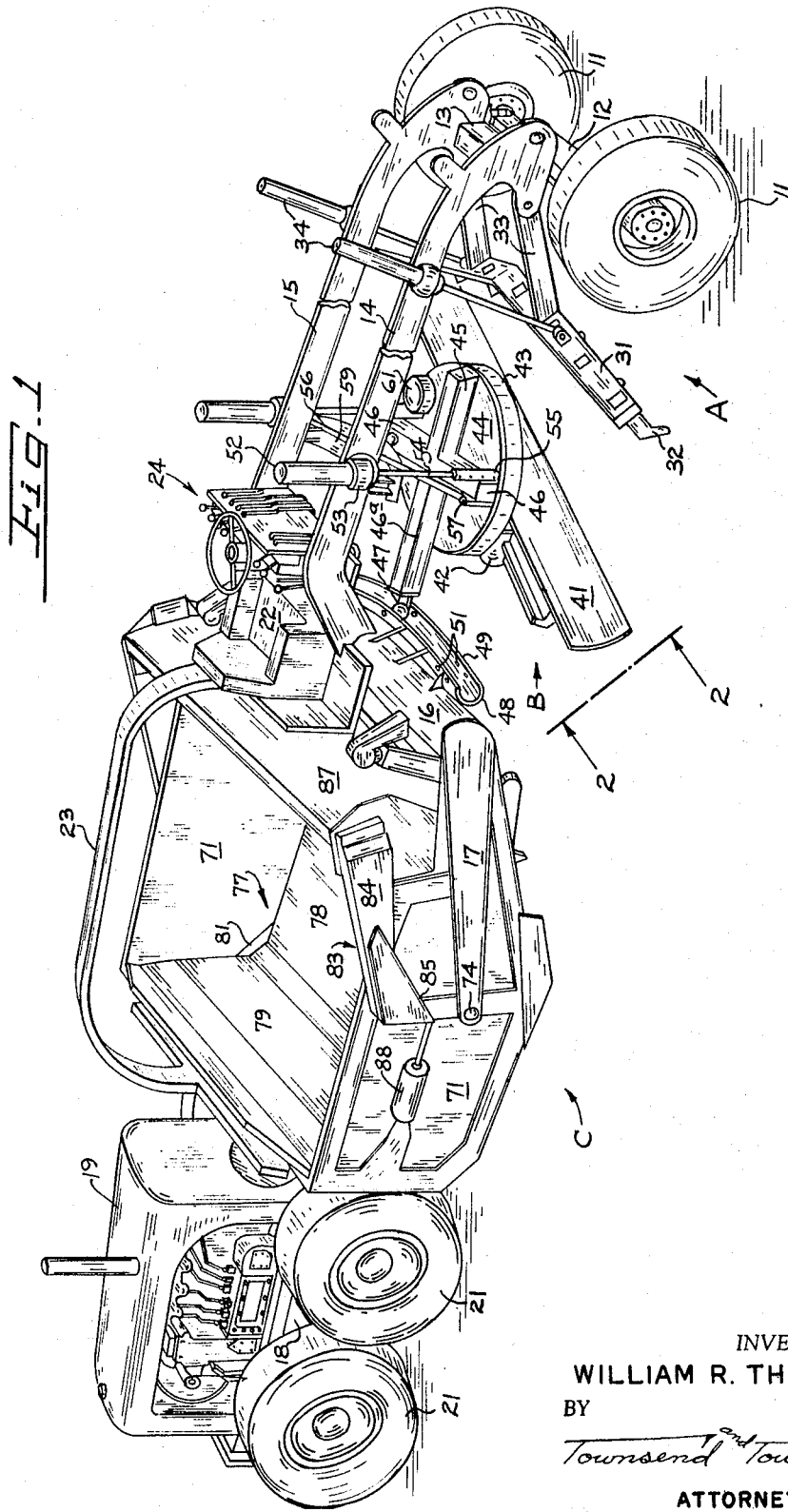
FIG. 1 is a perspective view of an earth handling machine embodying features of the present invention.
Figure 2:
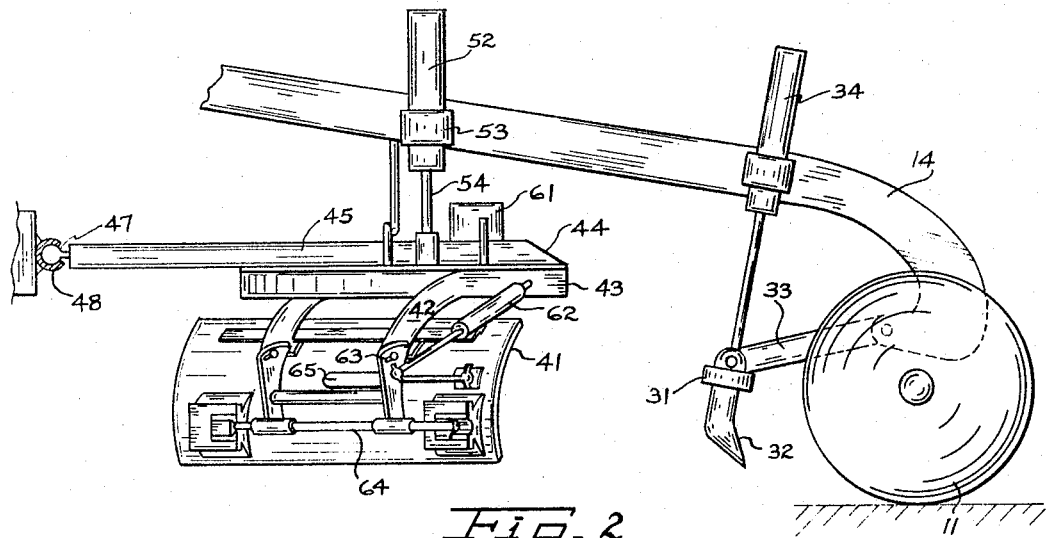
FIG. 2 is a side elevational view of the grader assembly portion of the machine shown in FIG. 1.

Referring now to the drawing, with particular reference to FIG. 1, there is shown a self-propelled motor driven earth handling machine according to the present invention phich includes a scarifier assembly A, a grader assembly B and a scoop bucket C mounted on a transportable frame. The frame includes a pair of front wheels 11, each rotatably mounted on an axle which is in turn mounted for rotation about a vertical axis at an end of a cross member 12. The wheels are turned by, for example, a hydraulic cylinder (not shown) which is connected by a rod linkage to each wheel and which is controlled from the operator's station described in greater detail below. Mounted, such as, for example, by welding, on the cross member 12 and spaced apart by a mounting block 13 are the forward ends of a pair of arcuate frame members 14 and 15. These frame members 14 and 15 extend rearwardly of the machine and have their rearward ends secured in a spaced apart manner such as, for example, by welding, to a transversely extending cross member or draft tube 16.

A pair of draft arms 17 and 17' extend from the ends of the draft tube 16 rearwardly of the machine and are rotatably connected to the scoop bucket assembly C in a manner described in greater detail below. The rear portion of the scoop bucket assembly C is secured, such as by welding, to a platform 18 on which the power source or motor 19 is positioned. The motor 19 may be of any conventional type but is typically a diesel engine. The motor platform 18 is supported on a rear axle and suitable power transmitting means, such as, for example, a transmission, gears and planetary axles (not shown) are provided for transmitting power from the engine to tandem-driven sets of rear wheels 21.

The operator's platform or chair 22 is mounted between the arcuate frame members 14 and 15 above the draft tube 16 and between the grader assembly B and the scoop assembly C. A power system such as, for example, a hydraulic system for operating the separate assemblies of the machine is provided and includes a hydraulic pump and oil supply tank (not shown) mounted with the engine. The high and low pressure hydraulic lines from the pump run from adjacent the engine in a steel channeled support 23 over the top of the scoop bucket assembly C to a bank of control valves 24 conveniently located in front of the operator's chair 22 and to the various fluid-operated jacks or hydraulic cylinders to be described in greater detail below.

The scarifier assembly A includes a V-shaped support bar 31 extending transversely of the machine and provided with a number of spaced apart teeth 32. One end of each of two spaced apart support arms 33 is rigidly secured to the bar 31, such as, for example, by welding, and the opposite ends of the support arms 33 are rotatably connected to the arcuate members 14 and 15 by means of, for example, bolts. The height of the scarifier teeth above ground is controlled by a pair of fluid jacks 34, one of which is rotatably mounted on each of the arcuate frame members 14 and 15 whereby the bar 31 can be raised and lowered by actuation of the fluid jacks 34 from a control valve at the operator's platform 22. The spaced apart fluid jacks provide good support and positive control of the scarifier support bar 31. The scarifier support bar 31 can be raised by the fluid jacks 34 all the way up to the arcuate members 14 and 15 thereby giving the operator complete visibility of the grading operation described below.

The grader assembly B includes a moldboard 41 which is rotatably supported in a manner described in greater detail below, on the lower ends of a pair of support arms 42 depending from a movable annular circle member 43. The movable circle member 43 is mounted in a conventional manner by adjustable shoes (not shown) on a fixed circle member or grader assembly plate 44. The circle member or plate 44 is secured such as by welding, to the underneath face of the top portion of a cross-shaped push bar 45 which has outwardly extending arms 46 which form the cross piece and an elongate base portion 46a which forms the bottom of the cross. The arms 46 and the top portion of the cross extend to the edge of the plate 44. The base portion 46a is provided with a ball 47 adapted to be supported and held in a channel socket member 48 which is provided with a longitudinal slot 49 through which the base portion 46a passes. The socket member 48 has an arcuate configuration and is secured to the front of the draft tube 16 such as, for example, by welding, with the lowest portion of the arc located centrally of the machine. Dual pairs of bolt holes 51 are provided along the length of the channel support to receive pairs of bolts which are so spaced as to confine the ball 47 at different desired positions along the length of the socket member.

The height of the grader assembly above ground is controlled by a pair of hydraulic jacks 52, each of which is pivotally supported, such as by the pivot support 53, on one of the arcuate members 14 and 15. Each jack 52 has a telescoping piston rod 54 adjustably pivotally secured, such as, for example, by a ball and socket joint 55 to one of the arms 46 of the push bar 45. By moving the hydraulic jacks 52, the grader assembly B, including the moldboard 41 is raised and lowered. An adjustable length telescoping brace rod 56 is provided for holding the grader assembly B against angular shifting, and the rod 56 is pivotally secured at one end, such as, for example, by a ball and socket joint 57, to one arm 46 of the push bar 45 and at the other end, to the axle of a gear wheel (not shown) which is adjustably held in an arcuate gear channel 59.

By this mounting arrangement, the moldboard can be positioned horizontally beneath the transportable frame of the machine and by lateral positioning of the ball 47 and by proper adjustment of the hydraulic jacks 52 and the brace rod 56, the grader assembly can be shifted laterally in order to position the moldboard at a desired angle for sloping banks on either side of the machine.

The angular position of the moldboard is adjusted in a conventional manner by a hydraulic motor 61 mounted on the top side of the greater assembly plate 44 and provided with a spur pinion (not shown) which meshes with gear teeth on the inside annular surface of the movable circle member 43. The movable circle member 43 is rigidly held in place in any desired work position by the hydraulic motor 61. The pitch of the moldboard is hydraulically controlled by a hydraulic jack 62 which is mounted between the movable circle member 43 and one of two mounting brackets 63 on the back of the moldboard 41, the support arms 42 being rotatably mounted on the brackets 63. The mounting brackets 63 are journaled on a shaft 64 mounted near the bottom of the moldboard 41 and are slidably contained in a track near the top of the moldboard, and the moldboard is shiftable laterally by actuation of a hydraulic jack 65 which is mounted on one of the brackets 63 and has the end of its piston rod secured to the moldboard 41.

Referring now to FIGS. 3 and 4, the scoop bucket assembly C includes two side panels 71 spaced apart at their front ends by a tubular cross member 72 and at their back ends by angle braces 73, one of which is welded to the mortar platform 18. Each of the side panels 71 is rotatably secured to the front end of the machine frame by a pin 74 which is journaled in the rearward end of the adjacent draft arm 17. An excavating lip 75 extends between the side panels 71 at the bottom edges thereof and is provided with a front cutting edge 76.

Between the side panels and back of the excavating lip 75 is positioned an integral bucket 77 having a bottom panel and a back panel 78 and 79 respectively which are joined together at each side of the machine by an angle bracket 81. The forward end of each bracket 81 is rotatably mounted on the adjacent side panel 71 by means of a pin 82 secured in the side panel adjacent the excavating lip 75. When the bucket 77 is being loaded or is in a carrying position, the back panel 79 rests against the angle braces 73. An apron arm 83, including a forwardly extending portion 84 and a downwardly extending portion 85, is rotatably supported on each side panel 71 by a pin 76 which is journaled in the arm 83 between the extending portions. A reinforced apron panel 87 is secured by welding between the ends of the forwardly projecting portions 84 of the arms 83 and closes the front of the bucket 77 as shown in phantom in FIG. 4 when the bucket is loaded. A hydraulic jack 88 is mounted on each side panel 71 and is pivotally secured to the downwardly extending portion 85 of the arms 83 for rotating the arms to move the apron from a position closing the front of the bucket to a loading position partially opening the front of the bucket as shown in FIG. 3 and to a dumping position as shown in FIG. 4. A cable 89, tied at its one end to the angle bracket 81, passes over a pulley 91 and is tied at its other end to the forwardly extending portion 84 of the arm 83 so that when the hydraulic jacks 88 are actuated to move the apron panel 87 to dumping position, cable 89 pulls the bucket 77 forward to dump the bucket.

A pair of spaced apart frame extension members 92 project upwardly and rearwardly from the draft tube 16, and a hydraulic jack 93 is secured between each of these extension members 92 and the cross member 72 at the front of the bucket assembly. Actuation of the hydraulic jacks 93 moves the scoop bucket assembly C from a lowered loading position in which the excavating lip engages the ground (as shown in FIG. 3) to a raised carrying or dumping position in which the excavating lip is above ground (as shown in FIG. 4).

It is noted that the pitch and height of the moldboard 41 can be adjusted to a certain degree by operation of the hydraulic jacks 93 which control the height of the excavation lip 76. As the hydraulic jacks 93 are operated to pivot the front and back ends of the frame about an axis through the pins 74, the pitch and height of the moldboard is changed.

Figure 5:
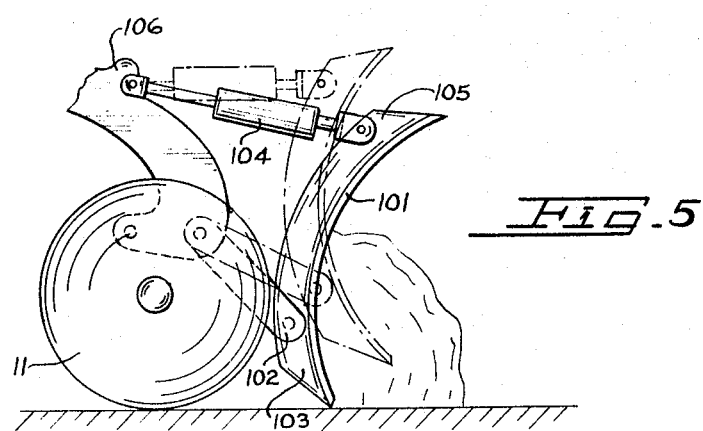
FIG. 5 is a side elevational view of a bulldozer attachment on the front end of the machine shown in FIG. 1.

Referring now to FIG. 5, as an additional feature, the earth handling machine according to the present invention is adapted for mounting a bulldozer blade 101 on the front of the machine. This is accomplished by a pair of support arms 102 which are rotatably mounted, such as, for example, by bolts, on brackets 103 near the bottom of the bulldozer blade 101. The other ends of these support arms 102 are rotatably joined, such as, for example, by bolts, to the rearward end of the arcuate members 14 and 15. Additionally, a pair of hydraulic jacks 104 are positioned between brackets 105 on the upper portion of the back side of the blade 101 and mounting arms 106 which project upwardly from adjacent the front end of the arcuate members 14 and 15. By actuation of the hydraulic jacks 104, the bulldozer blade is raised and lowered as desired. It is obvious that other means can be provided for raising or lowering the blade without the slight tilting of the blade that is produced by the arrangement described above. The hydraulic jacks 104 can be operated by separate control levers at the operator's station. It is possible to provide a diversion valve in the fluid lines to the fluid jacks 34 which operate the scarifier assembly A so that the bulldozer blade is operated with the control levers provided for the scarifier assembly.

Figure 6:
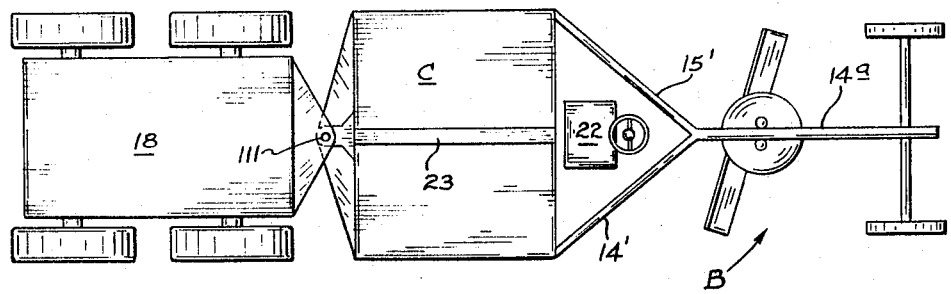
FIG. 6 is a schematic plan view of a machine including alternative embodiments of the present invention.

As an additional feature of the present invention, and as shown schematically in FIG. 6, the earth handling machine can be provided with means for moving the position of the rear wheels with respect to the front of the machine frame for reducing the turning radius. As shown in FIG. 6, a massive vertical axis hinge 111 is provided between the back of the scoop bucket assembly structure and the motor platform 18 whereby the frame will swing about the vertical axis of the hinge 111 when the machine is in motion and the front wheels are turned. Clearance is provided for swinging the frame through approximately 15°. Obvously, it is possible to pivot the frame of the mahine in a poistion other than that described above. Furthermore, the back wheels can be moved with respect to the front end of the frame by mounting the tandem sets of rear wheels on a fifth wheel assembly on top of which the motor platform 18 is supported. With this construction, the fifth wheel assembly may be rotated with respect to the motor platform to steer the machine either alone or in combination with the steering means described above for steering the front wheels.

As shown in FIG. 6 it is possible to construct front end portion of the frame with a single arcuate member 14a which is joined to the draft tube by two extension arms 14' and 15' in the shape of a V. This construction enables the operator to observe operation of the grader assembly and scarifier assembly though the V of the extensions 14' and 15' and see the ground in front of the machine over the single frame arcuate portion 14a which extends rearwardly from the front wheels to the extensions 14' and 15'.

With the earth handling machine described above it is possible to use each of the assemblies individually or in combination with one or more of the other assemblies. For example, it is possible to scarify and grade or scarify and load the scoop bucket assembly at the same time or scarify, grade and load the scoop bucket all in one operation. Each of these operations can also be combined with a bulldozing operation. Also, it is possible to slope banks or dig drain ditches with the grader and load the loose material or clean up excess material at the same time. Additionally, it is possible to widen fills by grading the previous load laterally at the same time a new load is being dumped from the bucket assembly. This later operation is used to great advantage in banking turns on a right of way.

In all of these operations the operator has a clear view of the operation and the ground in front of the machine. Controls for all of the apparatus on the machine are provided in the control bank 24 for finger tip operation of every function of the machine.

Instead of the motor and drive means described above, the machine can be driven by electric wheels powered by a generator mounted in place of the motor described above.

By way of example, a typical earth handling machine according to the present invention is 32 feet long 8 feet wide and powered by a 235 horse-power diesel engine. The machine weighs approximately 24,000 lbs., distributed approximately 16,800 lbs. to the rear wheels and 7,200 lbs. to the front wheels. The machine weighs approximately 46,000 lbs. loaded (8 cubic yards in the scoop bucket) distributed 36,800 lbs. to the rear wheels and 9,200 lbs. to the front wheels. The amount of the load can be varied to provide sufficient traction for operating the machine under the different operating conditions existing when one or more assembly is operated. The grader blade is 12 feet long, the scarifier 6 feet wide and the bulldozer blade 8 feet wide and 2 feet high. When the hinge construction illustrated in FIG. 6 is utilized, the hinge pin is approximately 6 inches in diameter and 4 feet long.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. An earth handling machine comprising: a transportable frame adapted to support a plurality of earth handling assemblies; a grader assembly; means for supporting said grader assembly on said frame; a scoop bucket assembly; means for supporting said scoop bucket assembly on said frame behind said grader assembly; and power means supported on said frame for operating said grader assembly and driving said transportable frame; said means fo supporting said grader asembly on said frame including, a socket member connected to said frame in front of said scoop bucket assembly, a push bar, means for mounting said grader assembly on said push bar, a ball on one end of said bar and constructed and arranged to fit in said socket member, a pair of fluid operated jacks pivotally mounted on said frame forward of said socket member and having piston rods projecting therefrom pivotally connected to said push bar whereby said grader assembly is movably supported from said push bar on said frame in front of said scoop bucket assembly and pushed by said push bar.

2. An earth handling machine comprising: a transportable frame; a grader assembly including a fixed circular member and a rotating circular member; means for supporting said grader assembly on said frame; and power means supported on said frame for operating said gader assembly and driving said transportable frame; said means for supporting said grader assembly on said frame including, an elongate channel socket member supported on said main frame, a push bar having arms projecting therefrom adjacent one end thereof for supporting said fixed circular member of said grader assembly and a ball on the other end thereof constructed and arranged to fit in said channel socket member, a pair of fluid operated jacks pivotally mounted on said frame forward of said socket member and having piston rods projecting therefrom pivotally connected to said arms of said push bar, and means for supporting said rotating circular member adjacent said fixed circular member whereby said grader assembly is movably supported from said push bar on said frame in front of said socket member.

3. An earth handling machine comprising: a transportable frame having a front and a back end and adapted to support a plurality of earth handling assemblies, said transportable frame having at the front end thereof a cross bar and a pair of ground engaging wheels supported therefrom, a draft tube extending across the machine behind the front wheels, a pair of spaced apart, arcuate members extending between said cross bar and said draft tube and ground engaging wheels at said back end of said frame; a scarifier assembly; means for supporting said scarifier assembly on the front of said frame, including a pair of fluid operated jacks, each of which is pivotally connected to one of said arcuate members; a grader assembly including a fixed circular member and a rotating circular member; means for supporting said grader assembly on said frame, behind said scarifier assembly including an elongate arcuate channel socket member supported on said draft tube, a push bar having arms projecting therefrom, adjacent one end thereof for supporting said fixed circular member of said grader assembly and a ball on the other end thereof constructed and arranged to fit in said socket member, a pair of fluid operated jacks, each pivotally mounted on one of said arcuate members, forward of said socket member and having piston rods projecting therefrom pivotally connected to said arms of said push bar, and means for suporting said movable circular member adjacent said fixed circular member; a scoop bucket assembly; means for supporting said scoop bucket assembly on said frame and behind said grader assembly; power means mounted on said frame for operating said assemblies and driving said transportable frame; control means for operating said power means; an operating platform positioned on said frame between said pair of arcuate members and between said grader assembly and said scoop bucket assembly; means for mounting said control means on said platform; means for moving the position of said back wheels with respect to the front of said frame including a hinge between said scoop bucket assembly and said ground engaging wheels at said back end of the machine; and having a vertical axis and swingably joining the front of said transportable frame to the back of said transportable frame.

4. The earth-handling machine in accordance with claim 1 characterized further in that said transportable frame includes a front and back end wth ground-engagng wheels at said front and back end, means for turning said front wheels about a vertical axis for steering the machine, and means for moving the position of said back wheels for making sharp turns including a hinge assembly having a vertical axis swingably joining the front of said transportable frame to the back of said transportable frame.

5. The earth-handling machine in accordance with claim 2 characterized further in that said transportable frame includes a front and back end with ground-engaging wheels at said front and back end, means for turning said front wheels about a vertical axis for steering the machine, and means for moving the position of said back wheels for making sharp turns including a hinge assembly having a vertical axis swingably joining the front of said transportable frame to the back of said transportable frame.

References Cited by the Examiner

UNITED STATES PATENTS

| | | | |
|---|---|---|---|
| 1,759,647 | 5/1930 | Kincannon | 37—145 |
| 1,907,807 | 5/1933 | Henneuse | 37—156 |
| 2,223,213 | 11/1940 | Kersten. | |
| 2,494,324 | 1/1950 | Wright | 37—156 |
| 2,841,898 | 7/1958 | Sampson | 37—117.5 X |
| 2,910,790 | 11/1959 | Armington | 37—126 X |
| 2,984,026 | 5/1961 | Thompson et al. | 37—145 X |
| 3,027,662 | 4/1962 | Cunningham | 37—153 X |
| 3,083,479 | 4/1963 | Knight | 37—126 |
| 3,104,480 | 9/1963 | Reynolds | 37—117.5 |

FOREIGN PATENTS 1,048,700   8/1953   France.

OTHER REFERENCES

Engineering News Record Publication, vol. 126, No. 14, Apr. 9, 1959, page 1 relied on.

ANTONIO F. GUIDA, *Acting Primary Examiner.*

ABRAHAM G. STONE, *Examiner.*

R. L. HOLLISTER, *Assistant Examiner.*